United States Patent [19]
Dobreski et al.

[11] Patent Number: 5,919,535
[45] Date of Patent: *Jul. 6, 1999

[54] FINS FOR PLASTIC BAGS

[75] Inventors: David V. Dobreski; Steve P. Long, both of Fairport, N.Y.

[73] Assignee: Tenneco Packaging, Evanston, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/759,445

[22] Filed: Dec. 5, 1996

[51] Int. Cl.$^6$ ............................ B65D 33/16; B29D 22/00; D04H 3/02

[52] U.S. Cl. ..................... 428/35.2; 428/35.5; 428/35.7; 383/63; 383/64

[58] Field of Search ................................ 428/35.2, 35.5, 428/35.7; 383/63, 64, 78, 97, 105, 94

[56] References Cited

U.S. PATENT DOCUMENTS

| | | | |
|---|---|---|---|
| 4,808,561 | 2/1989 | Welborn, Jr. | 502/104 |
| 4,871,523 | 10/1989 | Datta et al. | 423/265 |
| 4,871,705 | 10/1989 | Hoel | 502/117 |
| 4,925,318 | 5/1990 | Sorensen | 383/63 |
| 4,925,821 | 5/1990 | Change | 502/107 |
| 4,937,301 | 6/1990 | Chang | 526/128 |
| 4,971,454 | 11/1990 | Branson et al. | 383/61 |
| 5,001,205 | 3/1991 | Hoel | 526/128 |
| 5,004,356 | 4/1991 | Matsui | 383/63 |
| 5,006,500 | 4/1991 | Chang | 502/107 |
| 5,007,143 | 4/1991 | Herrington | 24/400 |
| 5,017,021 | 5/1991 | Simonsen et al. | 383/63 |
| 5,017,655 | 5/1991 | Kase et al. | 525/127 |
| 5,026,798 | 6/1991 | Canich | 526/127 |
| 5,032,652 | 7/1991 | Chang | 526/129 |
| 5,050,736 | 9/1991 | Griesbach et al. | 206/484 |
| 5,063,069 | 11/1991 | Van Erden et al. | 426/122 |
| 5,070,194 | 12/1991 | Sasoka et al. | 540/214 |
| 5,079,205 | 1/1992 | Canich | 502/117 |
| 5,084,534 | 1/1992 | Welborn, Jr. et al. | 526/160 |

(List continued on next page.)

FOREIGN PATENT DOCUMENTS

| | | |
|---|---|---|
| 0 371 402 | 6/1990 | European Pat. Off. . |
| 600 425 A1 | 6/1994 | European Pat. Off. ........ B32B 27/32 |
| WO 94/25271 | 11/1994 | WIPO ............................ B32B 27/08 |
| WO 94/26816 | 11/1994 | WIPO ............................ C08L 23/08 |
| WO95/29604 | 11/1995 | WIPO . |
| WO95/35046 | 12/1995 | WIPO . |
| WO95/35047 | 12/1995 | WIPO . |
| WO95/35048 | 12/1995 | WIPO . |

OTHER PUBLICATIONS

Schut, Jan H., "Competition for Metallocenes Could Turn Ugly," *Plastics World* (Jan. 1995), pp. 33–36.

*Primary Examiner*—Ellis Robinson
*Assistant Examiner*—Jennifer M. Hayes
*Attorney, Agent, or Firm*—Arnold White & Durkee

[57] ABSTRACT

A plastic bag comprises first and second panels each having a top, a bottom, and first and second opposing sides. The first and second panels are joined to each other along their respective bottoms, their respective first opposing sides, and their respective second opposing sides. The plastic bag includes a zipper having a male and female track. The male track includes a male profile and a first fin, in which the first fin is affixed to the first panel in proximity to the top of said first panel. The female track includes a female profile and a second fin, in which the second fin being is affixed to the second panel in proximity to the top of said second panel. The male and female profiles having complementary cross-sections. The inventive fins comprises a first resin and optionally a second resin which along with the fins seals are able to withstand greater forces and more adverse conditions. At least one of the fins comprises a first resin having a polydispersity of about 1 to about 4, a melt index of about 0.2 to about 20, and a melt flow ratio of about 12 to about 35. The second resin, if used, may either be coextruded or blended with the first resin.

35 Claims, 2 Drawing Sheets

U.S. PATENT DOCUMENTS

| | | | |
|---|---|---|---|
| 5,124,418 | 6/1992 | Welborn, Jr. | 526/114 |
| 5,131,121 | 7/1992 | Herrington, Jr. et al. | 24/436 |
| 5,152,613 | 10/1992 | Herrington, Jr. | 383/63 |
| 5,183,867 | 2/1993 | Welborn, Jr. | 526/114 |
| 5,185,909 | 2/1993 | Inagaki | 24/587 |
| 5,188,461 | 2/1993 | Sorensen | 383/63 |
| 5,206,075 | 4/1993 | Hodgson, Jr. | 428/216 |
| 5,238,306 | 8/1993 | Heintz et al. | 383/61 |
| 5,273,809 | 12/1993 | Simmons | 428/212 |
| 5,279,693 | 1/1994 | Robinson et al. | 156/272.8 |
| 5,301,395 | 4/1994 | Richardson et al. | 24/400 |
| 5,330,269 | 7/1994 | Kamada et al. | 383/210 |
| 5,358,792 | 10/1994 | Mehta et al. | 428/516 |
| 5,380,810 | 1/1995 | Lai et al. | 526/352 |
| 5,382,631 | 1/1995 | Stehling et al. | 525/240 |
| 5,405,478 | 4/1995 | Richardson et al. | 156/308.4 |
| 5,415,904 | 5/1995 | Takubo et al. | 428/35.2 |
| 5,523,136 | 6/1996 | Fischer et al. | 428/35.2 |
| 5,645,905 | 7/1997 | Takubo et al. | 428/35.7 |

FINS FOR PLASTIC BAGS

FIELD OF THE INVENTION

The present invention relates generally to plastic bags. More particularly, the present invention relates to the use of particular polymers in food bags to strengthen the fins and fin seals that attach the zipper to the bag.

BACKGROUND OF THE INVENTION

The use of plastic bags is increasingly more common in the marketplace. However, a factor affecting their acceptance and range of application is the strength and reliability of the bags and the seals.

Plastic bags are in widespread use in a varied and diverse number of household and commercial applications. The primary advantage of plastic bags is their ease of opening and resealing. The plastic bag includes first and second opposing body panels fixedly connected to each other along a pair of sides and a bottom, in which the bottom extends between the pair of sides. The plastic bag includes a fastener such as a zipper extending along a mouth formed opposite the bottom of the plastic bag. The zipper includes a male track and a female track. The male track includes a male profile and a first depending fin or flange extending downward from the male profile. Likewise, the female track includes a female profile and a second depending fin or flange extending downward from the female profile. The first and second fins may be extruded separately from the body panels and then thermally fused to inner surfaces of the respective first and second body panels.

The male and female tracks may be rolled or pressed into their interlocking arrangement so as to securely close the bag by one of two means. First, the tracks are rolled or pressed together at one end by a user and then sequentially fitted together along the length of the zipper by the user running a finger along the length of the zipper on each side of the tracks. Alternatively, some bags employ a plastic slider that rides along the tracks of the zipper. If the slider is pulled in one direction, the bag is sealed shut; if the slider is pulled in the opposite direction, the bag is reopened.

Plastic bags with a zipper-type closure mechanism typically have at least two types of seals. One type of seal (the "side seal") seals a first body panel to a second opposing body panel along the sides of the plastic bag. A second type of seal (the "fin seal") is created when a plastic fin is used to attach the zipper-type closure mechanism to the body panels. Since the popularity of these bags has placed increased demands on the tasks they are asked to perform, a need exists for bags having fin seals that are able to withstand increased forces and more adverse conditions.

SUMMARY OF THE INVENTION

It is an object of the present invention to create plastic bags that have fins and fin seals that are able to withstand greater forces and more adverse conditions than previous bags.

The present invention improves performance of the fin seal by making the fin out of resins that have a narrow molecular weight distribution or polydispersity ($M_w/M_n$ or MWD). The inventive fin comprises a first resin and optionally a second resin. The first resin is a polymer having a narrow molecular weight distribution or polydispersity of from about 1 to about 4, a melt index of from about 0.2 to about 20, and a melt flow ratio ($I_{20}/I_2$) of from about 12 to about 35. Examples of the first resins are linear low density polyethylenes (LLDPE) and metallocene-catalyzed LLDPE. The use of narrow molecular weight distribution resins, like the first resin, results in fin seals which are stronger, tougher, and less likely to leak. The second resin is a polymer such as low density polyethylene (LDPE), LLDPE, or a blend thereof.

In fins comprising both a first and a second resin, the first resin may be coextruded with a second resin as a thin layer of the fin or may be blended with the second resin. Preferably, the fins are formed entirely of the first resin. In one embodiment, a thin layer of the first resin having a narrow molecular weight distribution is coextruded with at least one of the following of the second resins: LDPE resin, LLDPE resin or a LDPE/LLDPE blend. The term "layer" as used herein shall include any coating, film, lamination coextrusion or the like.

Figure 3:
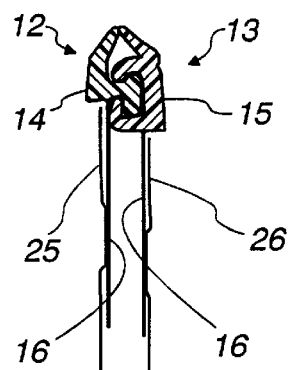
FIG. 3 is a cross-sectional view taken generally along the lines 3—3 in FIG. 2.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Figure 1:
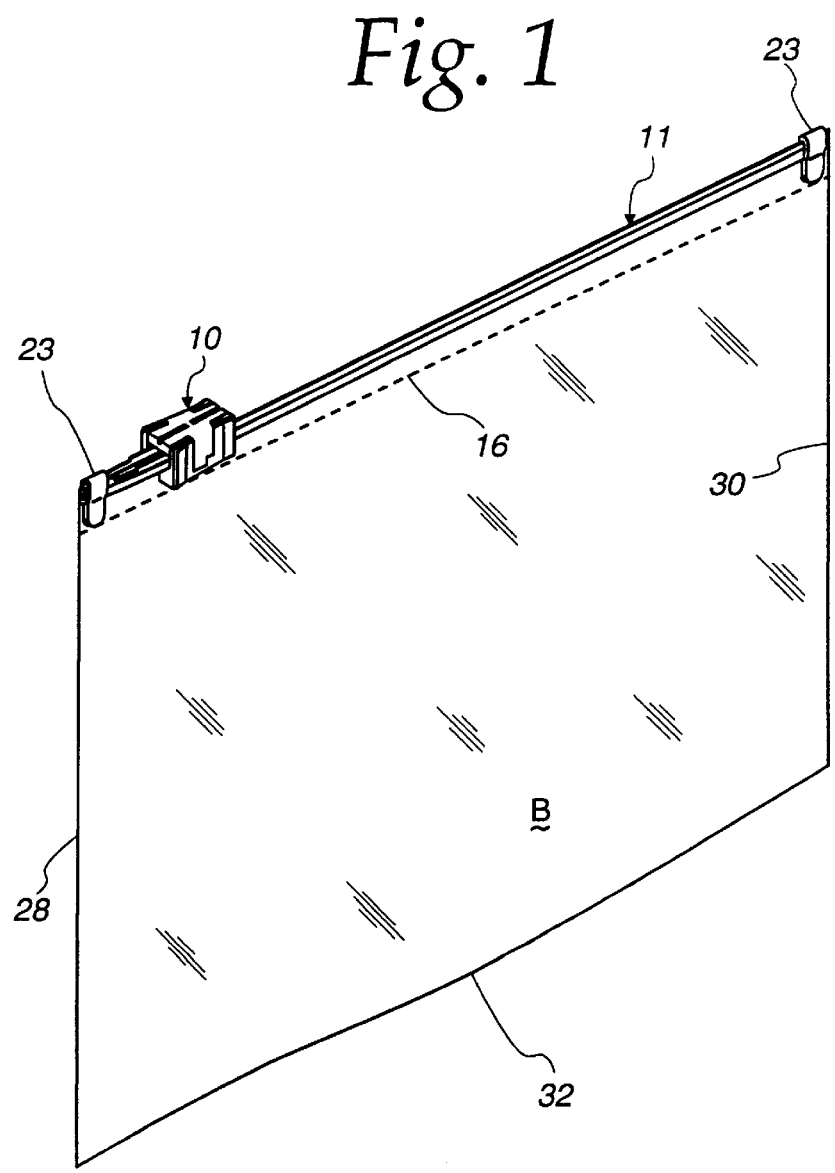
FIG. 1 is a perspective view of a thermoplastic bag having a fastener and slider.

Referring to FIG. 1, there is illustrated a plastic slider 10 and a profiled plastic fastener or zipper 11. The slider 10 and zipper 11 are particularly suited for thermoplastic bags and the like. Slider 10 has been illustrated in FIG. 2 assembled on the zipper 11 at the top edge or mouth of a thermoplastic bag B. The plastic slider 10 and the profiled zipper 11 cooperate to close the bag B. In a preferred embodiment, the bag B (as shown in FIGS. 1 and 3) is formed from a single flexible plastic sheet folded upon itself and comprises first and second opposing body panels 25 and 26. Body panels 25 and 26 are fixedly connected to each other along a pair of sides 28 and 30 and a bottom 32 which extends between the pair of sides 28 and 30. Bag B preferably has the zipper 11 extending along a mouth formed opposite the bottom 32 of bag B, in which the zipper 11 has a male track 12 and a female track 13.

Figure 2:
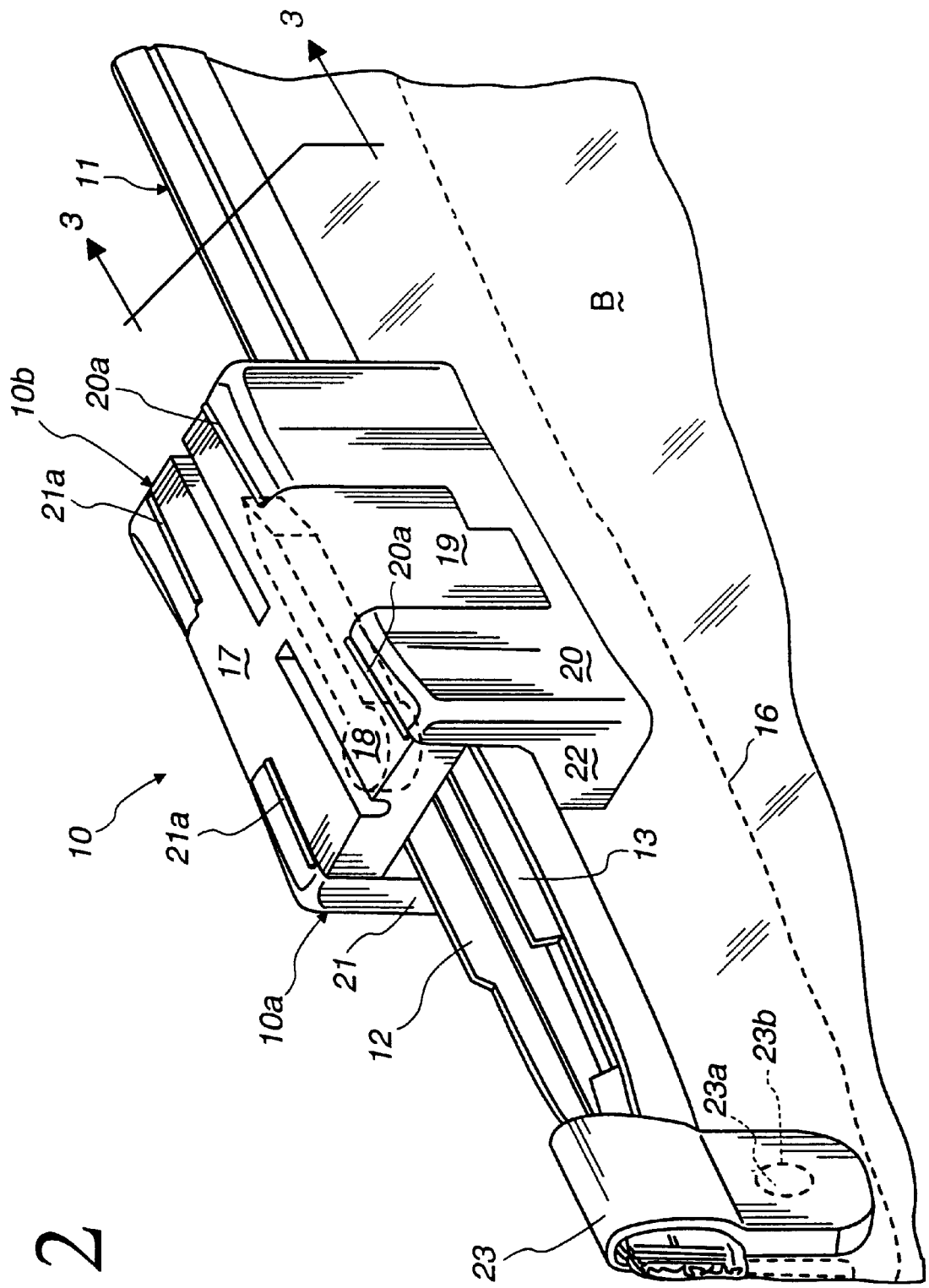
FIG. 2 is an enlarged perspective view of the fastener and slider of FIG. 1 in assembled position on a thermoplastic bag.

As shown in FIGS. 2 and 3, tracks 12 and 13 have interlocking male and female profiles 14 and 15 extending the length thereof in the form of rib and groove elements on the respective tracks. The tracks 12 and 13 may be extruded separately with a fin and attached to the respective sides of the bag mouth or the tracks 12 and 13 may be extruded integral with the sides of the bag mouth. If the tracks 12 and 13 are extruded separately, they are most effectively attached by means of a respective first and second fin 16, incorporated within the tracks, that is heat sealed to the bag mouth. The male and female profiles 14 and 15 have complementary cross-sectional shapes and are closed by pressing a bottom of the elements together first and then rolling the elements to a closed position toward the top thereof. The cross-sectional shapes of the interlocking male and female profiles 14 and 15 are the subject of the invention claimed in U.S. Pat. No. 5,007,143, which is incorporated herein by reference.

As may be seen in FIG. 2, the slider 10 straddles the zipper 11 at the top of the bag B and is adapted for opening or closing the interlocking tracks 12 and 13 of the zipper 11. The slider 10 may be molded from any suitable plastic such as, for example, nylon, polypropylene, polyethylene, polystyrene, Delrin or ABS.

In a preferred embodiment, shown in FIG. 2, the slider 10 comprises an inverted U-shaped member including a transverse support member or body 17 from which the separator finger 18 extends downward. The body 17 is itself U-shaped and includes two integral legs 19 extending downward. The finger 18 is positioned between the legs 19. The body 17 is adapted to move along the top edges of the tracks 12 and 13 with the legs 19 straddling these elements and the finger 18 positioned between the tracks 12 and 13. The slider 10 also includes a pair of hinged "wings" 20 and 21 that can be folded down into their final position. The wings 20 and 21 are hinged to the main slider body 17 by means of hinge structures 20a and 21a located at the opposite ends of the legs 19.

The foldable depending wings or side walls 20 and 21 extend from an opening end 10a of the slider 10 to a closing end 10b. It will also be noted that the main slider body 17 and the separator finger 18 are wider at the opening end 10a than at the closing end 10b. Similarly, the side walls 20 and 21 and the legs 19 are spaced wider apart at the opening end 10a of the slider 10 to permit separation of the male and female profiles 14 and 15 by the finger 18 engaging the tracks 12 and 13. The wings 20 and 21 and legs 19 are spaced sufficiently close together at the closing end 10b of the slider to press the male and female profiles 14 and 15 into an interlocking relationship as the slider 10 is moved in a fastener closing direction. As shown in FIG. 2, the side walls 20 and 21 at their lower ends are provided with an inwardly extending shoulder structure 22. Shoulder structure 22 engages a bottom of the zipper 11 to prevent slider 10 from being lifted off the edges of the tracks 12 and 13 while the slider 10 straddles the zipper 11.

The opposite ends of the zipper 11 are provided with end termination clips 23. Each of the end clips 23 is identical and is best shown in FIG. 2. Each end clip 23 comprises a strap member which wraps over the top of the zipper 11. One end of the strap is provided with a rivet like member 23a which is adapted to penetrate through the bag material and into a cooperating opening 23b at the other end of the clip 23. The rivet 23a is then deformed so as to create a head locked into the opening 23b.

The fins 16 of the present invention comprise at least one resin which possesses excellent resistance to stress cracking and superior fin seal strength when heat sealed to a body panel. These fins 16 significantly reduce fin seal failure caused by contact with hot and/or acidic foods in comparison to control low density polyethylene (LDPE) fins.

The first resin is comprised of a copolymer prepared, preferably, in the presence of a single-site catalyst with ethylene and at least one alpha olefin monomer, e.g. a copolymer or terpolymer. The alpha olefin monomer generally has from 3 to about 12 carbon atoms, preferably from 4 to 10 carbon atoms, and more preferably from 6 to 8 carbon atoms. The alpha olefin comonomer content is generally below about 30 weight percent, preferably below about 20 weight percent, and more preferably from about 1 to about 15 weight percent. Exemplary comonomers include propylene, 1-butene, 1-pentene, 1-hexene, 3-methyl-1-pentene, 4-methyl-1-pentene, 1-octene, 1-decene, and 1-dodecene.

The average molecular weight of the first resin can generally range from about 20,000 to about 500,000 and preferably from about 50,000 to about 200,000. The molecular weight is determined by commonly used techniques such as size exclusion chromatography or gel permeation chromatography. The first resin has a polydispersity within the range of from about 1 to about 4, preferably from about 1.5 to about 4, more preferably from about 2 to 4, and even more preferably from about 2 to 3. The first resin has a ratio of the third moment to the second moment, $M_z/M_w$, is generally below 2.3, preferably below 2.0, and more typically from about 1.6 to about 1.95. The melt flow ratio (MFR) of these resins, defined as $I_{20}/I_2$ and determined in accordance to ASTM D-1238, is generally from about 12 to about 35, preferably from about 12 to about 31, and more preferably from about 12 to about 20. The melt index (MI), defined as the $I_2$ value, should be in the range of from about 0.2 to about 20, and preferably from about 1 to about 17 g/10 min. The first resin has a density of from about 0.85 to about 0.94 g/cm$^3$, preferably from about 0.88 to about 0.925 g/cm$^3$, and more preferably from about 0.88 to about 0.920 g/cm$^3$.

Resin materials which may be used for the first resin are available from, among others, Dow Chemical Company and Exxon Chemical Company which produce single site or constrained geometry catalyzed polyethylenes. These resin materials are commercially available as the AFFINITY and EXXACT polyethylenes (see *Plastics World,* pp. 33–36, January 1995), and also as the ENHANCED POLYETHYLENE and EXCEED line of resins. The polyethylenes include at least the following: LLDPE, ultra low density polyethylene and very low density polyethylene. The manufacture of such polyethylenes, generally by way of employing a metallocene catalyst system, is set forth in, among others, U.S. Pat. Nos. 5,382,631, 5,380,810, 5,358,792, 5,206,075, 5,183,867, 5,124,418, 5,084,534, 5,079,205, 5,032,652, 5,026,798, 5,017,655, 5,006,500, 5,001,205, 4,937,301, 4,925,821, 4,871,523, 4,871,705, and 4,808,561, each of which is hereby incorporated herein by reference in its entirety. These catalyst systems and their use to prepare such resin materials are also set forth in EP 0 600 425 A1 and PCT applications WO 94/25271 and 94/26816. The polyethylene resins produced generally have a crystalline content in excess of at least 10 weight percent, generally in excess of at least 15 weight percent. In a preferred embodiment metallocene catalysts are utilized, but other catalysts, such as single-site catalysts, are available as equivalent substitutes.

The above patents and publications generally report that these metallocene catalysts contain one or more cyclopentadienyl moieties in combination with a transition metal. The metallocene catalyst may be represented by the general formula $C_cMA_aB_b$ wherein C is a substituted or unsubstituted cyclopentadienyl ring; M is a Group 3–10 metal or Lanthanide series element, generally a Group IVB, VB, or VIB metal; A and B are independently halogens, hydrocarbyl groups, or hydrocarboxyl groups having 1–20 carbon atoms; a=0–3, b=0–3, and c=1–3. The reactions can take place in either gas phase, high pressure, slurry, or solution polymerization schemes.

The fins 16 of the present invention are preferably constructed entirely of a first resin, i.e., of polymers having a narrow molecular weight distribution. The fins 16 may also be constructed from a combination of the first resin with a second resin material. The fins 16 which comprise the first resin may contain the first resin in an amount ranging from at least about 5 weight percent to 100 weight percent. Other ranges contemplated include the first resin ranging from at least 5 weight percent to about 50 or about 75 weight percent. At the present time, however, from an economic viewpoint it is more desirable to have the fins 16 comprise from about 5 weight percent to about 25 weight percent first resin and most preferably at least about 10 to about 15 weight percent first resin.

The second resin material is preferably a linear low density polyethylene (LLDPE) resin having a density of from about 0.89 to about 0.94 g/cm$^3$, a LDPE resin having a density of from about 0.88 to about 0.935 g/cm$^3$ or a blend of the LLDPE and LDPE resins. The LLDPE is generally prepared by polymerizing ethylene with a comonomer which preferably has from 4–10 carbon atoms and more preferably 6–8 carbon atoms.

The first resin and the second resin may be incorporated into a fin in a number of ways. Second resins, such as LDPE and LLDPE resins or the LDPE/LLDPE blend, may be blended with the first resin prior to extrusion so as to create a multicomponent fin. Further, in a preferred embodiment, a thin layer of the first resin is coextruded with the LDPE or LLDPE resins or the LDPE/LLDPE blend. Additional resins are also contemplated, such as having a first resin coextruded with both the LDPE and LLDPE resins.

The present invention is equally effective for fins 16 having a number of layers. The fins 16 need not be composed of a single layer made in accordance with this disclosure. It is possible to incorporate any number of layers of varying and unlimited composition into a single fin. The object of increasing fin seal integrity is met if at least one of these layers is made in accordance with the present invention. Preferably, that layer is composed of metallocene-catalyzed polyethylene and is facing the body panel so that it is in direct contact with the body panel. However, a layer of the present invention not in direct contact with the body panel and comprising at least 5 weight percent of the fin 16 would also achieve increased fin seal integrity.

The following examples illustrate the effectiveness of the present invention in creating stronger fin seals.

EXAMPLE 1

Plastic bags with fins composed of metallocene-catalyzed polyethylene and LDPE were tested and compared to control plastic bags having fins made of LDPE. The fins on the inventive bags were composed of 25–100 total weight % metallocene-catalyzed polyethylene. The metallocene-catalyzed polyethylene of the inventive bags was blended with the LDPE prior to extrusion. The metallocene catalyzed polyethylene of the inventive bags had a density of from about 0.895 to about 0.90, a polydispersity of about 2.0, a melt index of from 1.2 to 16.5 g/10 min, and a melt flow ratio of from 15.0 to 18.0. The LDPE of the inventive and control bags had a density of about 0.918 g/cm$^3$, a polydispersity of 7.5, a melt index of 0.25 g/10 min, and a melt flow ratio of 143.

The fins of the inventive bags and the control bags were tested by means of a "chili test." The first step of the chili test was to heat 30 ounces of store-bought chili in a microwave oven to a point near boiling and the second step was to place the chili in one-gallon bags having the fins described above. The bags were placed on their sides in such a manner that the fin seals were in complete contact with the chili. The chili was allowed to remain in the bags for approximately 15 minutes. The inventive bags displayed significant improvements over the LDPE bag in the fin failure rate caused by contact with hot chili. The experiment resulted in none of the inventive fins failing within 15 minutes, but the control bags all failed within one to two minutes of placing the chili within the bag.

EXAMPLE 2

Plastic bags with fins constructed of narrow molecular weight LLDPE, LLDPE-LDPE blends, or metallocene-catalyzed polyethylene were compared to control plastic bags having fins made of LDPE. The LLDPE had a density of 0.918, a polydispersity of 3.5, a melt index of 3.0 g/10 min, and a melt flow ratio of 31. The metallocene-catalyzed polyethylene of the inventive bags had a density of 0.90, a polydispersity of 2.0, a melt index of 3.2 g/10 min, and a melt flow ratio of 17. The LDPE had a density of 0.918 g/cm$^3$, a polydispersity of 7.5, a melt index of 0.25 g/10 min, and a melt flow ratio of 143.

The inventive bags displayed significant improvements over the LDPE bag in the fin failure rate caused by contact with hot chili. The experiment resulted in none of the inventive fins failing within fifteen minutes, but the control bags all failed within one to two minutes of placing the chili within.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A zippered plastic bag comprising:

first and second panels each having a top, a bottom, and first and second opposing sides, said first and second panels being joined to each other along their respective bottoms, their respective first opposing sides, and their respective second opposing sides; and a zipper including a male and female track, said male track including a male profile and a first fin, said first fin being affixed to said first panel in proximity to said top of said first panel, said female track including a female profile and a second fin, said second fin being affixed to said second panel in proximity to said top of said second panel, said male and female profiles having complementary cross-sections, at least one of said fins made from a first resin which is prepared in the presence of a single-site catalyst, said first resin having a polydispersity of from about 2 to about 3, a melt index of from about 0.2 to about 20 g/10 min., and a melt flow ratio of from about 12 to about 35 and a second resin which is a low density polyethylene, at least one of said fins comprising from about 5 to about 50 weight percent of said first resin and from about 50 to about 95 weight percent of said second resin; and a slider being located on said zipper, said slider cooperating with said zipper in opening and closing said plastic bag by moving along said male and female tracks.

2. The plastic bag of claim 1 wherein said first resin is prepared in the presence of a metallocene catalyst.

3. The plastic bag of claim 1 wherein said first resin has a density of from about 0.85 to about 0.94 g/cm$^3$.

4. The plastic bag of claim 3 wherein said first resin has a density of from about 0.88 to about 0.925 g/cm$^3$.

5. The plastic bag of claim 4 wherein said first resin has a density of from about 0.88 to about 0.920 g/cm$^3$.

6. The plastic bag of claim 1 wherein said first resin has a melt flow ratio of from about 12 to about 31.

7. The plastic bag of claim 6 wherein said first resin has a melt flow ratio of from about 12 to about 20.

8. The plastic bag of claim 1 wherein said first resin has a melt index of from about 1 to about 17 g/10 min.

9. The plastic bag of claim 1 wherein each of said first and second fin comprise from about 5 to about 50 weight percent of the first resin and from about 50 to about 95 weight percent of said second resin.

10. The plastic bag of claim 9 wherein each of said first and second fin comprise from about 25 to about 50 weight percent of the first resin and from about 50 to about 75 weight percent of said second resin.

11. The plastic bag of claim 9 wherein each of said first and second fin comprise from about 5 to about 25 weight percent of the first resin and from about 75 to about 95 weight percent of said second resin.

12. The plastic bag of claim 11 wherein each of said first and second fin comprise from about 10 to about 15 weight percent of the first resin and from about 85 to about 90 weight percent of said second resin.

13. The plastic bag of claim 11 wherein each of said first and second fin comprise from about 15 to about 25 weight percent of the first resin and from about 75 to about 85 weight percent of said second resin.

14. The plastic bag of claim 13 wherein at least one of said fins is prepared by coextruding the first resin and the second resin.

15. The plastic bag of claim 13 wherein at least one of said fins comprises a blend of the first resin and the second resin.

16. A zippered plastic bag comprising:

first and second panels each having a top, a bottom, and first and second opposing sides, said first and second panels being joined to each other along their respective bottoms, their respective first opposing sides, and their respective second opposing sides; and a zipper including a male and female track, said male track including a male profile and a first fin, said first fin being affixed to said first panel in proximity to said top of said first panel, said female track including a female profile and a second fin, said second fin being affixed to said second panel in proximity to said top of said second panel, said male and female profiles having complementary cross-sections, at least one of said fins made from a first resin selected from the group consisting of an ultra low density polyethylene, a very low density polyethylene and a metallocene-catalyzed polyethylene, said first resin having a polydispersity of from about 1 to about 4, a melt index of from about 0.2 to about 20 g/10 min., and a melt flow ratio of from about 12 to about 35 and a second resin which is a low density polyethylene, at least one of said fins comprising from about 5 to about 50 weight percent of said first resin and from about 50 to about 95 weight percent of said second resin; and a slider being located on said zipper, said slider cooperating with said zipper in opening and closing said plastic bag by moving along said male and female tracks.

17. The plastic bag of claim 16 wherein said first resin is a copolymer of ethylene and at least one alpha olefin.

18. The plastic bag of claim 16 wherein said first resin is an ultra low density polyethylene.

19. The plastic bag of claim 16 wherein said first resin is a very low density polyethylene.

20. The plastic bag of claim 6 wherein said first resin is a metallocene catalyzed polyethylene.

21. The plastic bag of claim 16 wherein said first resin has a density of from about 0.85 to about 0.94 g/cm$^3$.

22. The plastic bag of claim 21 wherein said first resin has a density of from about 0.88 to about 0.925 g/cm$^3$.

23. The plastic bag of claim 22 wherein said first resin has a density of from about 0.88 to about 0.920 g/cm$^3$.

24. The plastic bag of claim 16 wherein said first resin has a polydispersity of from about 1.5 to about 4.

25. The plastic bag of claim 24 wherein said first resin has a polydispersity of from about 2 to about 4.

26. The plastic bag of claim 16 wherein said first resin has a melt flow ratio of from about 12 to about 31.

27. The plastic bag of claim 26 wherein said first resin has a melt flow ratio of from about 12 to about 20.

28. The plastic bag of claim 16 wherein said first resin has a melt index of from about 1 to about 17 g/10 min.

29. The plastic bag of claim 16 wherein each of said first and second fin comprise from about 5 to about 50 weight percent of the first resin and from about 50 to about 95 weight percent of said second resin.

30. The plastic bag of claim 29 wherein each of said first and second fin comprise from about 25 to about 50 weight percent of the first resin and from about 50 to about 75 weight percent of said second resin.

31. The plastic bag of claim 29 wherein each of said first and second fin comprise from about 5 to about 25 weight percent of the first resin and from about 75 to about 95 weight percent of said second resin.

32. The plastic bag of claim 31 wherein each of said first and second fin comprise from about 10 to about 15 weight percent of the first resin and from about 85 to about 90 weight percent of said second resin.

33. The plastic bag of claim 31 wherein each of said first and second fin comprise from about 15 to about 25 weight percent of the first resin and from about 75 to about 85 weight percent of said second resin.

34. The plastic bag of claim 16 wherein at least one of said fins is prepared by coextruding the first resin and the second resin.

35. The plastic bag of claim 16 wherein at least one of said fins comprises a blend of the first resin and the second resin.

* * * * *

UNITED STATES PATENT AND TRADEMARK OFFICE
CERTIFICATE OF CORRECTION

PATENT NO.:     5,919,535
DATED:          July 6, 1999
INVENTOR(S):    Dobreski et al.

It is certified that errors appear in the above-identified patent, and that said Letters Patent is hereby corrected as shown below.

Column 8, Claim 20, line 14, delete "6" and insert --16--.

Signed and Sealed this

Seventh Day of December, 1999

Attest:

Q. TODD DICKINSON

Attesting Officer

Acting Commissioner of Patents and Trademarks